(12) United States Patent
Nishida (10) Patent No.: US 10,195,991 B2
(45) Date of Patent: Feb. 5, 2019

(54) ABNORMALITY DETECTION DEVICE

(71) Applicant: DENSO CORPORATION, Kariya, Aichi-pref. (JP)

(72) Inventor: Miyuki Nishida, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/741,836

(22) PCT Filed: Jul. 14, 2016

(86) PCT No.: PCT/JP2016/070767
§ 371 (c)(1),
(2) Date: Jan. 4, 2018

(87) PCT Pub. No.: WO2017/022440
PCT Pub. Date: Feb. 9, 2017

(65) Prior Publication Data
US 2018/0194283 A1 Jul. 12, 2018

(30) Foreign Application Priority Data

Jul. 31, 2015 (JP) ................................. 2015-151907

(51) Int. Cl.
*B60Q 11/00* (2006.01)
*H05B 37/02* (2006.01)
*H05B 33/08* (2006.01)

(52) U.S. Cl.
CPC ....... *B60Q 11/005* (2013.01); *H05B 33/0806* (2013.01); *H05B 33/0884* (2013.01);
(Continued)

(58) Field of Classification Search
CPC .............. B60Q 11/005; B60Q 2300/05; B60Q 2300/146; H05B 33/0884; H05B 33/0806; H05B 37/02
See application file for complete search history.

(56) References Cited

U.S. PATENT DOCUMENTS

2002/0011807 A1* 1/2002 Kobayashi ......... H05B 41/2813
315/291
2013/0229733 A1* 9/2013 Woo .......................... H02H 3/22
361/40
(Continued)

FOREIGN PATENT DOCUMENTS

JP 2006279866 A 10/2006
JP 2008092277 A 4/2008
(Continued)

*Primary Examiner* — Erin F Heard
(74) *Attorney, Agent, or Firm* — Harness, Dickey & Pierce, P.L.C.

(57) ABSTRACT

An abnormality detection device includes a load connected to a load connection terminal; a first switching element, having one end connected to the load connection terminal, that switches between connection and disconnection of a power supply to the load; a control unit that switches between an on state and an off state of the first switching element; a detection unit that outputs a signal based on comparison between a voltage of the load connection terminal and a predetermined reference voltage; an acquisition unit that acquires the signal from the detection unit; a determination unit that determines that the load is in an abnormal state when the acquisition unit acquires an abnormality detection signal, which is a signal of a predetermined level, continuously for more than a predetermined first determination time period after the control unit switches the first switching element from the on state to the off state.

7 Claims, 6 Drawing Sheets

(52) U.S. Cl.
CPC ......... *H05B 37/02* (2013.01); *B60Q 2300/05* (2013.01); *B60Q 2300/146* (2013.01)

(56) References Cited

U.S. PATENT DOCUMENTS

| | | | |
|---|---|---|---|
| 2014/0253078 A1* | 9/2014 | Nishio | H03K 17/18 323/282 |
| 2016/0193974 A1* | 7/2016 | Nishida | B60T 8/00 307/9.1 |
| 2017/0227589 A1* | 8/2017 | Kawanaka | G01R 31/007 |
| 2018/0194283 A1* | 7/2018 | Nishida | B60Q 11/00 |

FOREIGN PATENT DOCUMENTS

| | | | |
|---|---|---|---|
| JP | 2010105590 A | | 5/2010 |
| JP | 2014216765 A | | 11/2014 |
| JP | 2015044423 A | | 3/2015 |
| JP | 2015076363 A | | 4/2015 |

* cited by examiner

| STATE | SHORT-TO-POWER | DISCONNECTION |
|---|---|---|
| Step1 | H | H |
| Step2 | H | L |

| STATE | SHORT-TO-GROUND | DISCONNECTION |
|---|---|---|
| Step1 | H | H |
| Step2 | H | L |

ABNORMALITY DETECTION DEVICE

CROSS REFERENCE TO RELATED APPLICATIONS

This application is a U.S. National Phase Application under 35 U.S.C. 371 of International Application No. PCT/JP2016/070767 filed on Jul. 14, 2016 and published in Japanese as WO 2017/022440 A1 on Feb. 9, 2017. This application is based on and claims the benefit of priority from Japanese Patent Application No. 2015-151907 filed on Jul. 31, 2015. The entire disclosures of all of the above applications are incorporated herein by reference.

TECHNICAL FIELD

The present disclosure relates to an abnormality detection device that detects an abnormality of a load.

BACKGROUND ART

A light emitting diode (LED) is widely used as the light source (load) of a lighting device of a vehicle. As a device for detecting failure such as disconnection of the LED, an LED disconnection detection device that supplies to the LED a pulse signal having such a pulse width that does not light the LED and detects the presence or absence of disconnection of the LED has been devised (see Patent Literature 1).

Further, an abnormality detection device of an LED lighting unit that determines an abnormality of the LED lighting unit before lighting the LED lighting unit has been devised (see Patent Literature 2).

Further, an LED abnormality detection device, including a pull-up circuit, that can detect disconnection by turning on a pull-up switching element of the pull-up circuit when a drive switching element is off and can detect short-to-power by turning off the pull-up switching element of the pull-up circuit when the drive switching element is off has been devised (see Patent Literature 3).

PRIOR ART LITERATURE

Patent Literature

Patent Literature 1: JP2010-105590A
Patent Literature 2: JP2015-044423A
Patent Literature 3: JP2014-216765A

SUMMARY OF INVENTION

In the case of detecting disconnection in an extinguished state of the LED as in Patent Literature 1, an external pull-up resistor is necessary for an IPD (Intelligent Power Device). With the external pull-up resistor, when a determination operation is performed in a non-disconnection state of the LED, the LED is lit (with dark illuminance). This is an unintended operation for a user, and might bring a feeling of strangeness to the user. Without having the pull-up resistor, it is not possible to distinguish between short-to-power and disconnection. Further, although control is performed with such a pulse width that does not light the LED, the lighting of the LED can be clearly recognized even in an operation with e.g. a frequency of 200 Hz and a pulse width of 250 μs (a duty ratio of 5%), and it can be said that this detection method is not realistic in consideration of a capacitor charging time, a CPU processing period, and the like.

In Patent Literature 2, even though the LED lighting unit is lit by an abnormality detection current, lighting is performed based on a lighting instruction immediately after a lapse of a first detection time, which does not lead to lighting at an unintended timing for the user, and does not bring a feeling of strangeness to the user. However, in recent years, depending on the load, it is required to categorize failure states based on regulations, and it is therefore necessary to categorize three states of short-to-ground in which the load is short-circuited to a ground, short-to-power in which the load is short-circuited to a power supply, and disconnection. Patent Literature 2 does not disclose about categorization of the state. Further, a current is consumed when the abnormality of the LED is detected.

In Patent Literature 3, the presence of disconnection and the presence of short-to-power are determined when the LED is lit for proper illumination etc.; therefore, even if the pull-up circuit lights the LED in the case of no disconnection, the user does not feel a feeling of strangeness. However, this is effective for a configuration including the pull-up circuit and the pull-up switching element for adjusting illuminance in addition to the drive switching element, but it is difficult to apply it to a device not including these circuit and element. Further, a current is consumed when the abnormality of the LED is detected.

It is an object of the present disclosure to provide an abnormality detection device that can simply categorize failure states of a load such as an LED and can perform this categorization without being noticed by the user.

According to an aspect of the present disclosure, an abnormality detection device includes: a load that is connected to a load connection terminal; a first switching element that has one end connected to the load connection terminal, and switches between connection and disconnection of a power supply to the load by being switched between an on state and an off state; a control unit that switches between the on state and the off state of the first switching element; a detection unit that outputs a signal based on comparison between a voltage of the load connection terminal and a predetermined reference voltage; an acquisition unit that acquires the signal from the detection unit; and a determination unit that determines that the load is in an abnormal state when the acquisition unit acquires an abnormality detection signal of a predetermined level continuously for more than a predetermined first determination time period after the control unit switches the first switching element from the on state to the off state.

With the above configuration, since the abnormality of the load is
determined after the disconnection of the power supply to the load, the load does not operate (e.g., the LED is not lit), and the user does not notice the determination operation. Further, a current is not consumed when the abnormality of the load is detected.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

First Embodiment

Figure 1:
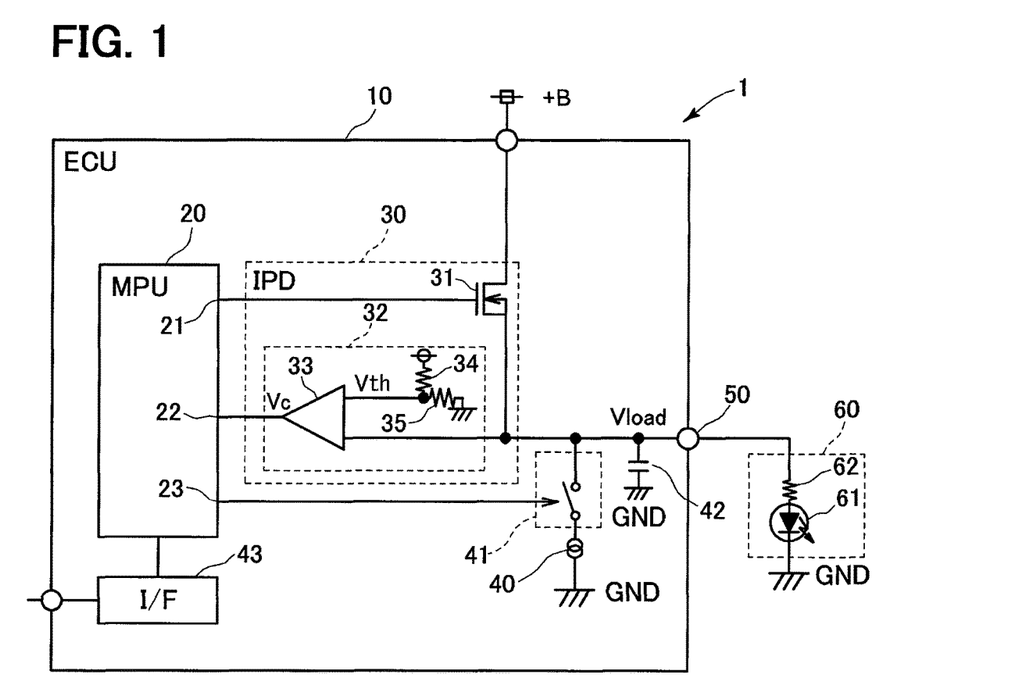
FIG. 1 is a diagram showing the configuration of an abnormality detection device (first embodiment)

A first embodiment will be described with reference to FIGS. 1 to 4. As shown in FIG. 1, an abnormality detection device 1 includes an ECU 10 and a load 60 connected between a load connection terminal 50 of the ECU 10 and a ground (GND).

The ECU 10 includes a well-known MPU 20 (control unit, determination unit), an IPD 30 connected between the MPU 20 and the load connection terminal 50, a switch 41 (second switching element) and a constant current circuit 40 (current supply unit) connected between the load connection terminal 50 and the ground (GND), a capacitor 42 for surge absorption connected between the load connection terminal 50 and GND, and an I/F 43 which is an interface circuit for communicating with another device.

The MPU 20 includes a well-known calculation unit, a peripheral circuit such as an ND converter and a signal input/output circuit, and a memory. The calculation unit executes a control program stored in the memory, and thereby achieves various functions of the ECU 10.

The IPD 30 includes a transistor 31 (first switching element) which is e.g. a well-known FET and a detection unit 32. The transistor 31 is connected between a power supply (+B) and the load connection terminal 50. Based on a control command outputted from a port 21 of the MPU 20, the transistor 31 switches between on and off states to perform drive control (e.g., PWM control) of the load 60. The detection unit 32 includes a well-known comparator 33. A reference voltage Vth generated by dividing a power supply voltage by resistors 34 and 35 and a voltage Vload of the load connection terminal 50 are inputted to the comparator 33. The comparator 33 outputs Vc which is a result of comparison between Vth and Vload to a port 22 (acquisition unit) of the MPU 20. The IPD 30 may be an integrated circuit, or may be of a discrete configuration.

The transistor 31 performs an on/off operation on a power supply side for supplying a current to the load 60. That is, the configuration of FIG. 1 corresponds to a configuration in which "the load (60) is connected between the load connection terminal and the ground (GND), the first switching element (31) is connected between the power supply and the load connection terminal, and the second switching element (41) and the current supply unit (40) are connected between the load connection terminal and the ground". With this configuration, it is possible to categorize the abnormality of the load by the device using the IPD 30 as a high side type driver, as shown in FIG. 1.

The switch 41 can be either a transistor or a relay. The switch 41 switches between on and off states, based on a control command outputted from a port 23 of the MPU 20. The constant current circuit 40 can be either a well-known constant current diode or a circuit using a transistor or an operational amplifier. The constant of the constant current circuit 40 is determined so that a current flows from the capacitor 42 to the constant current circuit 40.

The load 60 includes a well-known LED (light emitting diode) 61 and a resistor 62 for limiting a current flowing through the LED 61. The load 60 is not limited to the LED, and may be a motor, a solenoid, or a switch circuit.

Figure 2:
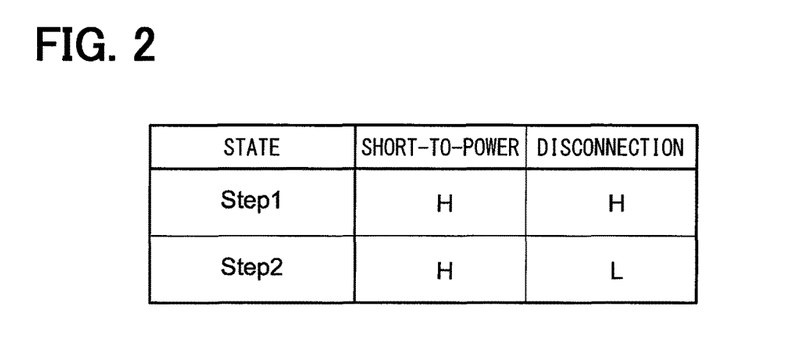
FIG. 2 is a diagram showing an output signal from a detection unit when an abnormality occurs (first embodiment)

FIG. 2 shows the state of an output signal (Vc) from the detection unit 32 (comparator 33) when the load 60 is abnormal. Assume that the transistor 31 is in an off state. If Vload>Vth, Vc is at an H level.

When the switch 41 is in an off state (Step 1), if the load 60 is short-circuited to the power supply, Vload is equal to the voltage of the power supply (+B). Therefore, Vc is at the H level. If the load 60 is disconnected, the load connection terminal 50 is in a floating state, and Vload is equal to a voltage between both ends of the capacitor 42, that is, the voltage of the power supply (+B). Therefore, Vc is at the H level.

When the switch 41 is in an on state (Step 2), if the load 60 is short-circuited to the power supply, Vc remains at the H level. If the load 60 is disconnected, electric charge accumulated in the capacitor 42 is discharged, and Vload=0 V. Therefore, Vc changes to an L level. Thereby, it is possible to distinguish between short-to-power and disconnection.

The H-level state of Vc corresponds to an abnormality detection signal. The details of the above states will be described later. The H level of Vc is, for example, the same level as the power supply voltage applied to the comparator 33. The L level of Vc is, for example, 0 V.

Figure 3:
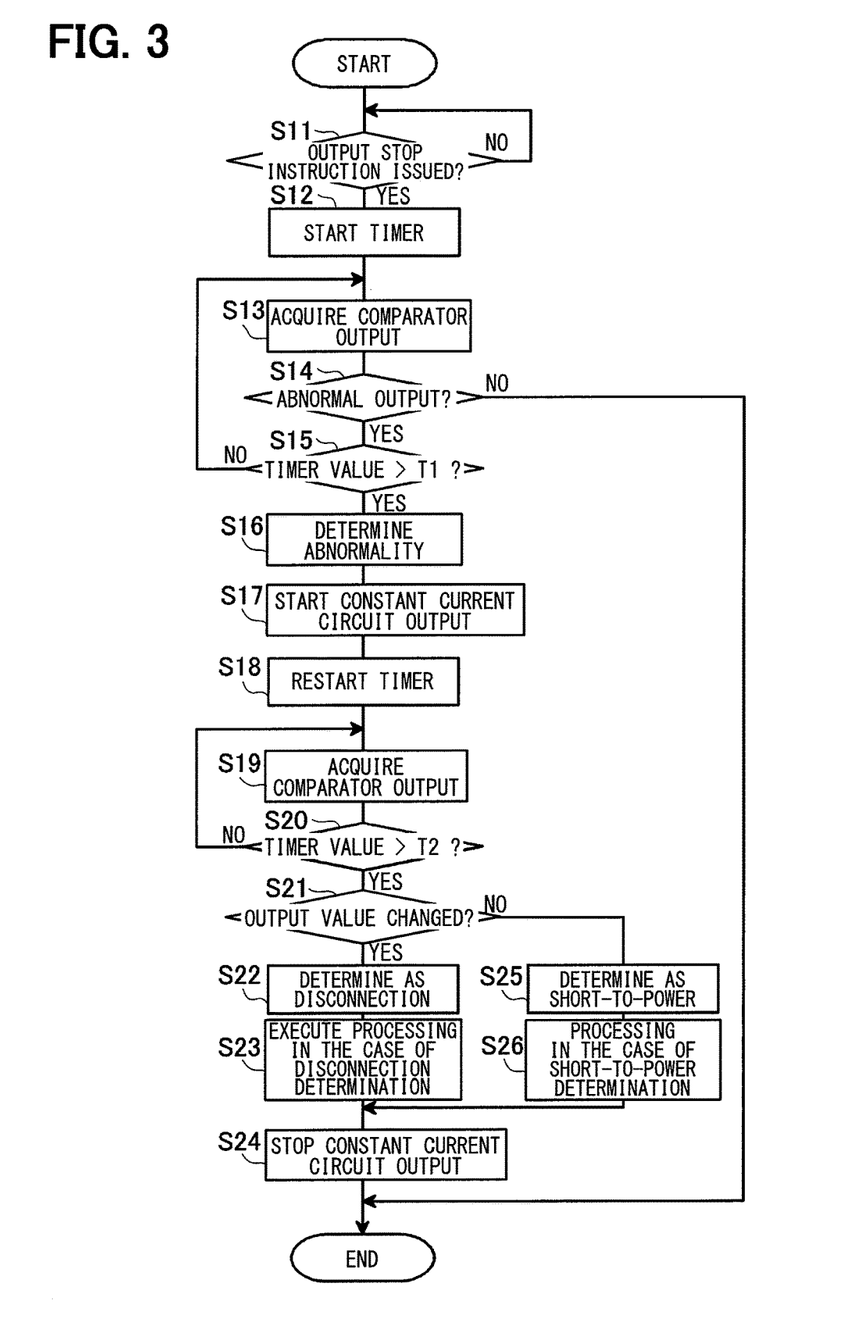
FIG. 3 is a flowchart for explaining abnormality determination processing (first embodiment)

FIG. 3 shows abnormality determination processing executed by the MPU 20 at a predetermined timing. First, it is determined whether or not an output stop instruction for bringing the transistor 31 from an on state to an off state is issued. If the output stop instruction is issued (S11: Yes), a timer is started (S12). Then, the state of the port 22 is monitored, and the value of Vc outputted from the comparator 33 is acquired (S13). The acquired Vc is A/D-converted and used in subsequent processing.

Then, it is determined whether or not the output of the comparator 33 is abnormal. That is, despite the off state of the transistor 31, if Vc is at the H level as shown in Step 1 of FIG. 2, it is determined that the output is abnormal. If Vc is at the L level (S14: No), the output of the comparator 33 is normal, and this processing is ended.

On the other hand, if Vc is at the H level (S14: Yes), the value of the timer is referred to, and it is determined whether or not the timer value exceeds a predetermined time T1 (first determination time period). If the timer value does not exceed T1 (S15: No), the flow returns to S13. On the other hand, if the timer value exceeds T1 (S15: Yes), it is determined that an abnormality occurs in the load 60 (S16).

T1 is set to a value larger than a time required for Vc to change from the H level to the L level when the transistor 31 is brought to the off state in the normal operation of the load 60.

Then, a control command is outputted from the port 23 so as to bring the switch 41 to the on state. Thereby, the constant current circuit 40 is connected to the load connection terminal 50, and current output is started (S17). Thereby, the current path of the capacitor 42→the switch 41→the constant current circuit 40→GND is formed. Then, the timer is restarted (S18).

Then, the value of Vc outputted from the comparator 33 is acquired (S19). This is performed until the value of the timer exceeds a predetermined time T2 (second determination time period). That is, the value of Vc is sampled for the period of T2.

The above-described configuration corresponds to a configuration in which "the current supply unit (40) connected to the load connection terminal through the second switching element (41) is included, the control unit brings the second switching element to the on state if the determination unit determines that the state of the load is abnormal, and the determination unit determines the details of the abnormality of the load based on the state of the signal acquired by the acquisition unit when the second switching element is in the on state". This configuration can be implemented by a combination of general circuits without using expensive devices and circuits. Further, this is an operation after the detection of some kind of abnormality, and does not bring a feeling of strangeness to the user.

If the value of the timer exceeds T2 (S20: Yes), it is determined whether or not the value of Vc has changed, using at least one of the followings.

It is determined that the value of Vc has changed when the value of Vc changes from the H level to the L level.

It is determined that the value of Vc has changed when the value of Vc falls below a predetermined value.

It is determined that the value of Vc has changed when the change amount of the value of Vc exceeds a predetermined value.

T2 is set so that it can be determined whether or not the value of Vc has changed. For example, T2 is set so as to be longer than a time required to discharge all electric charge accumulated in the capacitor 42.

If it is determined that the value of Vc (output value) has changed (S21: Yes), it is determined that the load 60 is in a disconnection state (S22). Then, processing in the case where the disconnection has been determined is executed (S23). For example, information that the load 60 is in the disconnection state is outputted to another device connected to the ECU 10 through the I/F 43. Alternatively, a notification unit (not shown) such as an LED or an LCD may be provided to notify the disconnection state. Then, the flow proceeds to S24.

The above-described configuration corresponds to a configuration in which "it is determined that the load is disconnected if a time period where the acquisition unit continuously acquires the abnormality detection signal after the control unit brings the second switching element to the on state falls below the second determination time period". With this configuration, it is possible to determine, by the device including the high side type driver circuit, whether or not the load is disconnected.

On the other hand, if it is determined that the value of Vc has not changed (S21: No), it is determined that the load 60 is in a short-to-power state in which the load 60 is in contact with the power supply (+B) (S25). Then, processing in the case where the short-to-power has been determined is executed (S26). In the processing, the short-to-power state of the load 60 is outputted or notified. Then, the flow proceeds to S24.

The above-described configuration corresponds to a configuration in which "it is determined that the load is short-circuited to the power supply if the time period where the acquisition unit continuously acquires the abnormality detection signal after the second switching element is brought to the on state exceeds the predetermined second determination time period". With this configuration, it is possible to determine, by the device including the high side type driver circuit, whether or not the load is short-circuited to the power supply.

In S24, a control command is outputted from the port 23 so as to bring the switch 41 to the off state. Thereby, the constant current circuit 40 is disconnected from the load connection terminal 50, and the current output is stopped.

Figure 4:
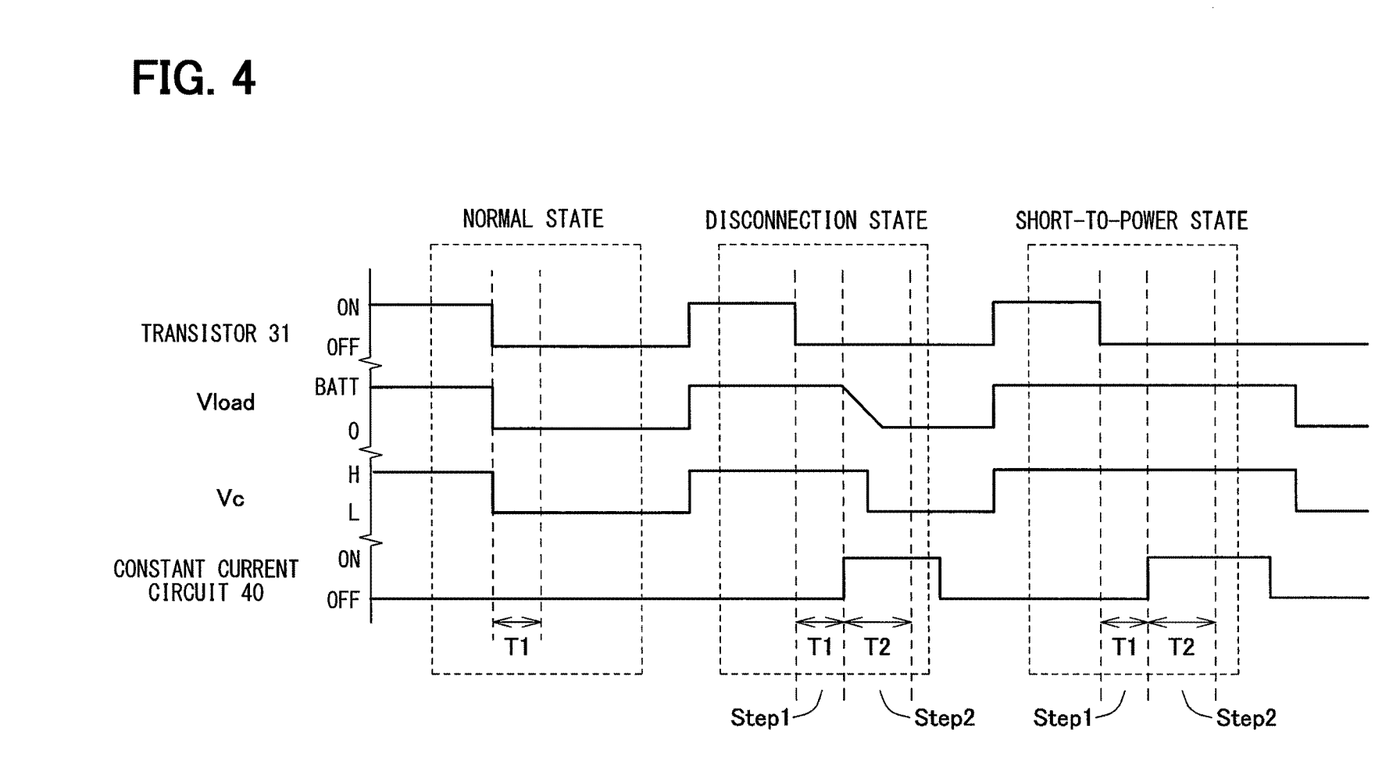
FIG. 4 is a timing chart for explaining abnormality determination (first embodiment)

FIG. 4 shows a timing chart showing the states of Vload, Vc, and the constant current circuit 40 in each of the states (normal state, disconnection state, short-to-power state) of the load 60 when the transistor 31 is brought from the on state (ON) to the off state (OFF) based on the control command of the MPU 20 from the port 21.

In the normal state, when the transistor 31 is brought from the on state to the off state, Vload changes from the voltage (BATT) of the power supply (+B) to 0 V at least before the time T1 elapses; accordingly, Vc also changes from the H level to the L level.

In the disconnection state, when the transistor 31 is brought from the on state to the off state, Vload remains at a power supply level even when T1 elapses; accordingly, Vc also remains at the H level (Step 1 of disconnection in FIG. 2). At this time, when the output of the constant current circuit 40 is started, electric charge accumulated in the capacitor 42 is discharged, and Vload decreases and finally becomes 0 V. Therefore, Vc also changes to the L level (Step 2 of disconnection in FIG. 2). Thereby, if Vc is at the L level when the time T2 elapses after the output of the constant current circuit 40 is started, it can be determined that the load is disconnected.

The short-to-power state is the same as the disconnection state until T1 elapses after the transistor 31 is brought from the on state to the off state (Step 1 of short-to-power in FIG. 2). However, Vload remains at BATT even when T2 elapses after the output of the constant current circuit 40 is started. Therefore, Vc also remains at the H level (Step 2 of short-to-power in FIG. 2). Thereby, if Vc is at the H level when the time T2 elapses after the output of the constant current circuit 40 is started, it can be determined that the load is short-circuited to the power supply.

Second Embodiment

Figure 5:
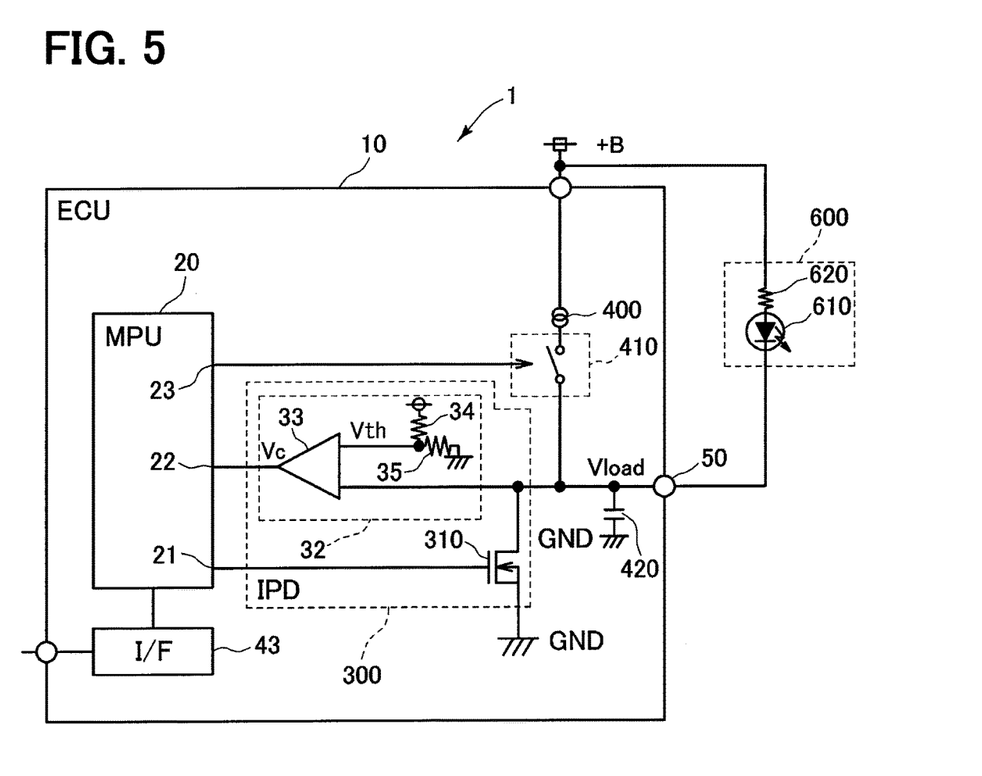
FIG. 5 is a diagram showing the configuration of an abnormality detection device (second embodiment)

A second embodiment will be described with reference to FIGS. 5 to 8. In FIG. 5, components with the same functions as in FIG. 1 are denoted by the same reference numerals, but ratings and constants can be made suitable for this embodiment.

As shown in FIG. 5, the abnormality detection device 1 includes the ECU 10 and a load 600 connected between the load connection terminal 50 of the ECU 10 and the power supply (+B).

The ECU 10 includes the well-known MPU 20 (control unit, determination unit), an IPD 300 connected between the MPU 20 and the load connection terminal 50, a switch 410 (second switching element) and a constant current circuit 400 (current supply unit) connected between the power supply (+B) and the load connection terminal 50, a capacitor 420 for surge absorption connected between the load connection terminal 50 and the ground (GND), and the I/F 43 which is an interface circuit for communicating with another device.

The configurations of the MPU 20 and the I/F 43 are the same as in FIG. 1.

The IPD 300 includes a transistor 310 (first switching element) and a detection unit 32. The transistor 310 is connected between the load connection terminal 50 and GND. Based on a control command outputted from the port 21 of the MPU 20, the transistor 310 switches between on and off states to perform drive control (e.g., PWM control) of the load 600. The detection unit 32 includes the well-known comparator 33. The reference voltage Vth generated by dividing the power supply voltage by the resistors 34 and 35 and the voltage Vload of the load connection terminal 50 are inputted to the comparator 33. The comparator 33 outputs Vc which is a result of comparison between Vth and Vload to the port 22 (acquisition unit) of the MPU 20.

The transistor 310 performs an on/off operation on the GND side of the load 600. That is, the configuration of FIG. 5 corresponds to a configuration in which "the load (600) is connected between the power supply and the load connection terminal, the first switching element (310) is connected between the load connection terminal and the ground (GND), and the second switching element (410) and the current supply unit (400) are connected between the power supply and the load connection terminal". With this configuration, it is possible to categorize the abnormality of the load by the device using the IPD 300 as a low side type driver, as shown in FIG. 5.

The switch 410 and the constant current circuit 400 have the same configurations as the switch 41 and the constant current circuit 40 in FIG. 1. The constant of the constant current circuit 400 is determined so that a current flows from the constant current circuit 400 to the capacitor 420.

The load 600 includes a well-known LED (light emitting diode) 610 and a resistor 620 for limiting a current flowing through the LED 610. The load 600 is not limited to the LED, and may be a motor, a solenoid, or a switch circuit.

Figure 6:
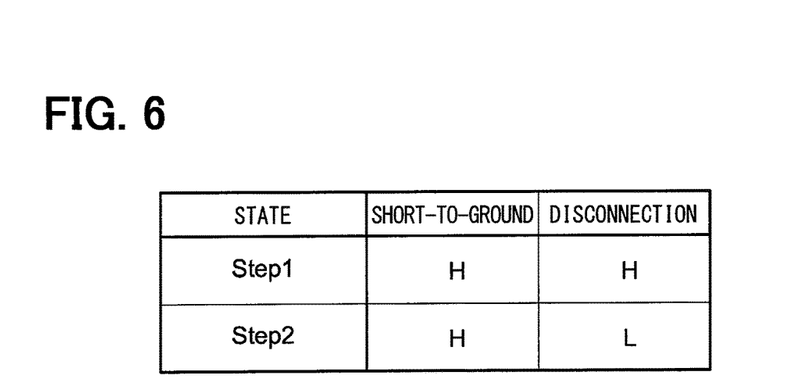
FIG. 6 is a diagram showing an output signal from a detection unit when an abnormality occurs (second embodiment)

FIG. 6 shows the state of an output signal (Vc) from the detection unit 32 (comparator 33) when the load 600 is abnormal. Assume that the transistor 310 is in an off state. If Vload<Vth, Vc is at the H level.

When the switch 410 is in an off state (Step 1), if the load 600 is short-circuited to the ground (GND), Vload is equal to GND (0 V). Therefore, Vc is at the H level. If the load 600 is disconnected, Vload is equal to a voltage between both ends of the capacitor 420. Since electric charge is not accumulated in the capacitor 420, Vload=0 V. Therefore, Vc is at the H level.

When the switch 410 is in an on state (Step 2), if the load 600 is short-circuited to the ground, Vc remains at the H level. If the load 600 is disconnected, electric charge is accumulated in the capacitor 420, and Vload becomes equal to the voltage of the power supply (+B). Therefore, Vc changes to the L level. Thereby, it is possible to distinguish between short-to-ground and disconnection.

The H-level state of Vc corresponds to an abnormality detection signal. The details of the above states will be described later. The H level of Vc is, for example, the same level as the power supply voltage applied to the comparator 33. The L level of Vc is, for example, 0 V.

Figure 7:
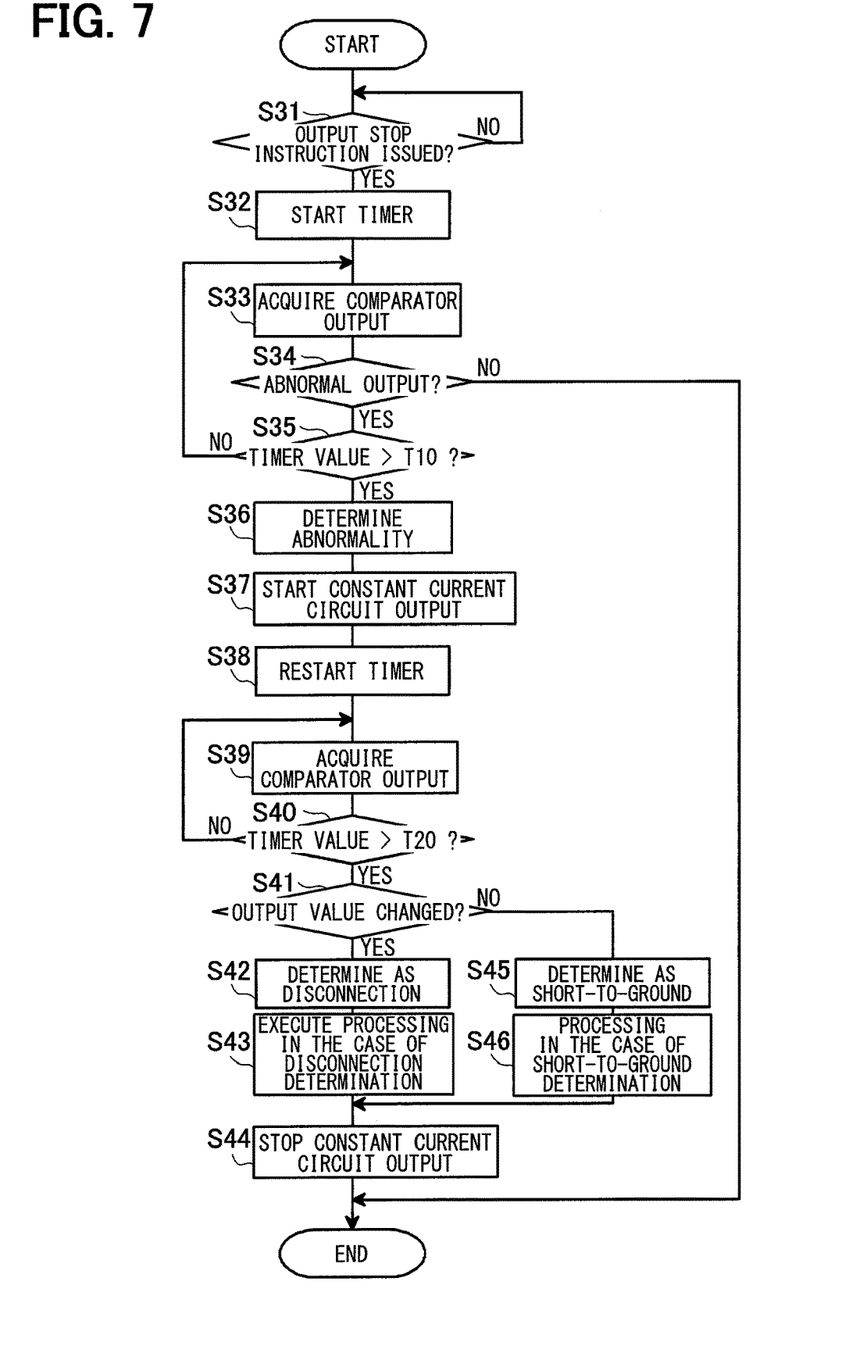
FIG. 7 is a flowchart for explaining abnormality determination processing (second embodiment)

FIG. 7 shows abnormality determination processing executed by the MPU 20 at a predetermined timing. Processing of S31 to S33 is the same as that of S11 to S13 in FIG. 3.

In S34, it is determined whether or not the output of the comparator 33 is abnormal. That is, despite the off state of the transistor 310, if Vc is at the H level as shown in Step 1 of FIG. 6, it is determined that the output is abnormal. If Vc is at the L level (S34: No), the output of the comparator 33 is normal, and this processing is ended.

On the other hand, if Vc is at the H level (S34: Yes), the value of the timer is referred to, and it is determined whether or not the timer value exceeds a predetermined time T10 (first determination time period). If the timer value does not exceed T10 (S35: No), the flow returns to S33. On the other hand, if the timer value exceeds T10 (S35: Yes), it is determined that an abnormality occurs in the load 600 (S36).

T10 is set to a value larger than a time required for Vc to change from the H level to the L level when the transistor 310 is brought to the off state in the normal operation of the load 600.

Then, a control command is outputted from the port 23 so as to bring the switch 410 to the on state. Thereby, the constant current circuit 400 is connected to the load connection terminal 50, and current output is started (S37). Thereby, the current path of the power supply (+B)→the constant current circuit 400→the switch 410→the capacitor 420→GND is formed. Then, the timer is restarted (S38).

Then, the value of Vc outputted from the comparator 33 is acquired (S39). This is performed until the value of the timer exceeds a predetermined time T20 (second determination time period). That is, the value of Vc is sampled for the period of T20.

If the value of the timer exceeds T20 (S40: Yes), it is determined whether or not the value of Vc has changed. The determination method is the same as in (S20: Yes) in FIG. 3.

The above-described configuration corresponds to a configuration in which "the current supply unit (400) connected to the load connection terminal through the second switching element (410) is included, the control unit brings the second switching element to the on state if the determination unit determines that the state of the load is abnormal, and the determination unit determines the details of the abnormality of the load based on the state of the signal acquired by the acquisition unit when the second switching element is in the on state". This configuration can be implemented by a combination of general circuits without using expensive devices and circuits. Further, this is an operation after the detection of some kind of abnormality, and does not bring a feeling of strangeness to the user.

T20 is set so that it can be determined whether or not the value of Vc has changed. For example, T20 is set so as to be longer than a time required to charge the capacitor 420 with electric charge to a threshold value for abnormality determination.

If it is determined that the value of Vc (output value) has changed (S41: Yes), it is determined that the load 600 is in a disconnection state (S42). Then, the same processing in the case where the disconnection has been determined as in S23 of FIG. 3 is executed (S43). Then, the flow proceeds to S44.

The above-described configuration corresponds to a configuration in which "it is determined that the load is disconnected if a time period where the acquisition unit continuously acquires the abnormality detection signal after the control unit brings the second switching element to the on state falls below the second determination time period". With this configuration, it is possible to determine, by the device including a low side type driver circuit, whether or not the load is disconnected.

On the other hand, if it is determined that the value of Vc has not changed (S41: No), it is determined that the load 600 is in a short-to-ground state in which the load 600 is in contact with the ground (GND) (S45). Then, processing in the case where the short-to-ground has been determined is executed (S46). In the processing, the short-to-ground state of the load 600 is outputted or notified, as in the processing in the case of disconnection determination. Then, the flow proceeds to S44.

The above-described configuration corresponds to a configuration in which "it is determined that the load is short-circuited to the ground if the time period where the acquisition unit continuously acquires the abnormality detection signal after the second switching element is brought to the on state exceeds the predetermined second determination time period". With this configuration, it is possible to determine, by the device including the low side type driver circuit, whether or not the load is short-circuited to the ground.

In S44, a control command is outputted from the port 23 so as to bring the switch 410 to the off state. Thereby, the constant current circuit 400 is disconnected from the load connection terminal 50, and the current output is stopped.

Figure 8:
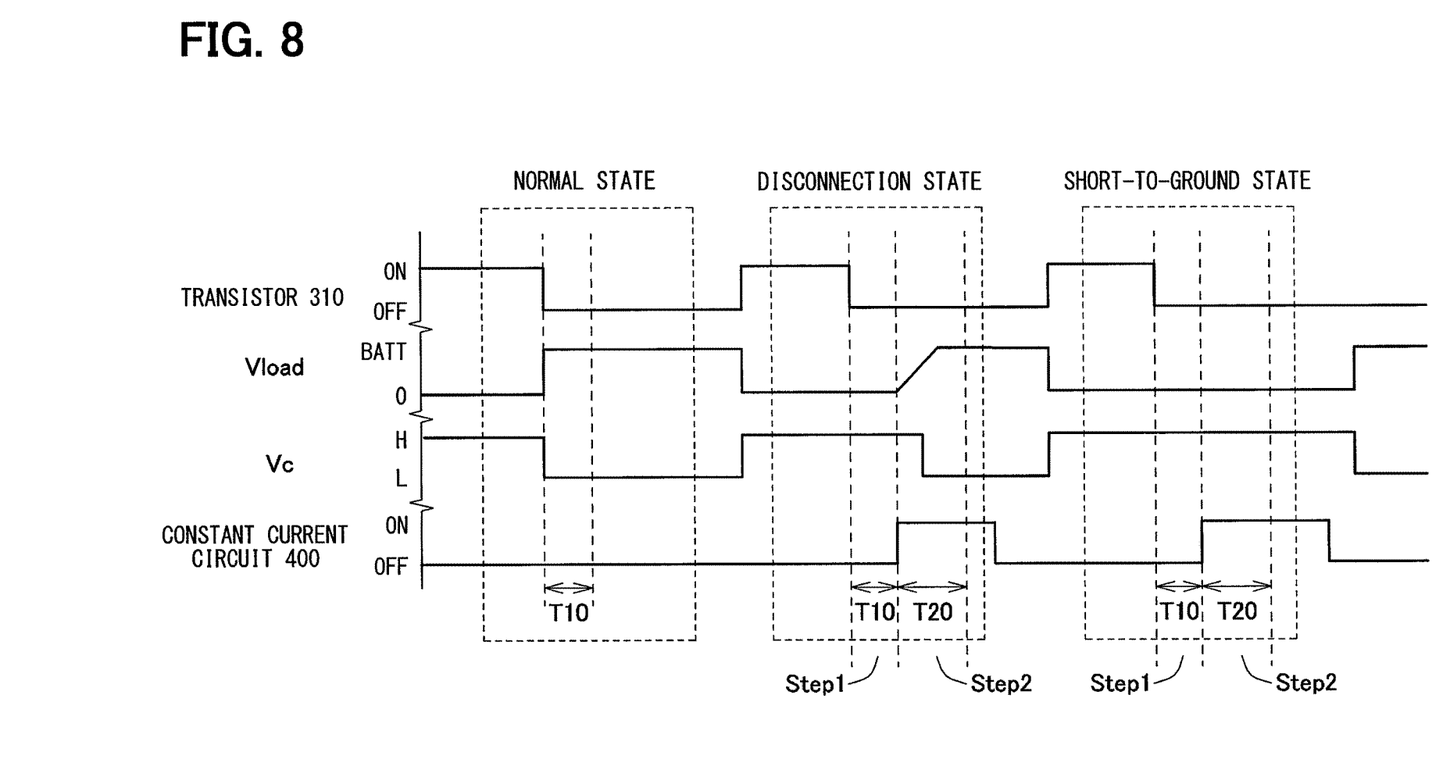
FIG. 8 is a timing chart for explaining abnormality determination (second embodiment).

FIG. 8 shows a timing chart showing the states of Vload, Vc, and the constant current circuit 400 in each of the states (normal state, disconnection state, short-to-ground state) of the load 600 when the transistor 310 is brought from the on state to the off state based on the control command of the MPU 20 from the port 21.

In the normal state, when the transistor 310 is brought from the on state to the off state, Vload changes from 0 V to the voltage (BATT) of the power supply (+B) at least before the time T10 elapses; accordingly, Vc also changes from the H level to the L level.

In the disconnection state, when the transistor 310 is brought from the on state to the off state, Vload remains at 0 V even when T10 elapses; accordingly, Vc also remains at the H level (Step 1 of disconnection in FIG. 6). At this time, when the output of the constant current circuit 400 is started, electric charge is accumulated in the capacitor 420, and Vload increases and finally becomes BATT. Therefore, Vc changes to the L level (Step 2 of disconnection in FIG. 6). Thereby, if Vc is at the L level when the time T20 elapses after the output of the constant current circuit 400 is started, it can be determined that the load is disconnected.

The short-to-ground state is the same as the disconnection state until T10 elapses after the transistor 310 is brought from the on state to the off state (Step 1 of short-to-ground in FIG. 6). However, Vload remains at 0 V even when T20 elapses after the output of the constant current circuit 400 is started. Therefore, Vc also remains at the H level (Step 2 of short-to-ground in FIG. 6). Thereby, if Vc is at the H level when the time T20 elapses after the output of the constant current circuit 400 is started, it can be determined that the load is short-circuited to the ground.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An abnormality detection device comprising:
a load that is connected to a load connection terminal;
a first switching element that has one end connected to the load connection terminal, and switches between connection and disconnection of a power supply to the load by being switched between an on state and an off state;
a control unit that switches between the on state and the off state of the first switching element;
a detection unit that outputs a signal based on comparison between a voltage of the load connection terminal and a predetermined reference voltage;
an acquisition unit that acquires the signal from the detection unit;
a determination unit that determines that the load is in an abnormal state when the acquisition unit acquires an abnormality detection signal of a predetermined level continuously for more than a predetermined first determination time period after the control unit switches the first switching element from the on state to the off state; and
a current supply unit that is connected to the load connection terminal through a second switching element, wherein
the control unit brings the second switching element to an on state when the determination unit determines that the load is in an abnormal state, and
the determination unit determines a detail of an abnormality of the load based on a state of the signal acquired by the acquisition unit when the second switching element is in the on state.

2. The abnormality detection device according to claim 1, wherein
the load is connected between the load connection terminal and a ground,
the first switching element is connected between the power supply and the load connection terminal, and
the second switching element and the current supply unit are connected between the load connection terminal and the ground.

3. The abnormality detection device according to claim 2, wherein
the determination unit determines that the load is short-circuited to the power supply if a time period where the acquisition unit continuously acquires the abnormality detection signal after the second switching element is brought to the on state exceeds a predetermined second determination time period.

4. The abnormality detection device according to claim 1, wherein
the load is connected between the power supply and the load connection terminal,
the first switching element is connected between the load connection terminal and the ground, and
the second switching element and the current supply unit are connected between the power supply and the load connection terminal.

5. The abnormality detection device according to claim 4, wherein
the determination unit determines that the load is short-circuited to the ground if a time period where the acquisition unit continuously acquires the abnormality detection signal after the second switching element is brought to the on state exceeds a predetermined second determination time period.

6. The abnormality detection device according to claim 5, wherein
the determination unit determines that the load is disconnected if the time period where the acquisition unit continuously acquires the abnormality detection signal after the control unit brings the second switching element to the on state falls below the second determination time period.

7. The abnormality detection device according to claim 3, wherein
the determination unit determines that the load is disconnected if the time period where the acquisition unit continuously acquires the abnormality detection signal after the control unit brings the second switching element to the on state falls below the second determination time period.

* * * * *